Aug. 11, 1964  G. H. THOMAS ETAL  3,143,888
PLANE RESOLVERS
Filed May 6, 1960  4 Sheets-Sheet 1
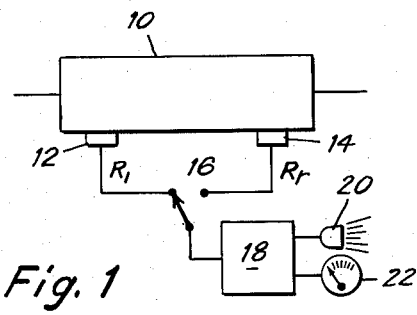
Fig. 1
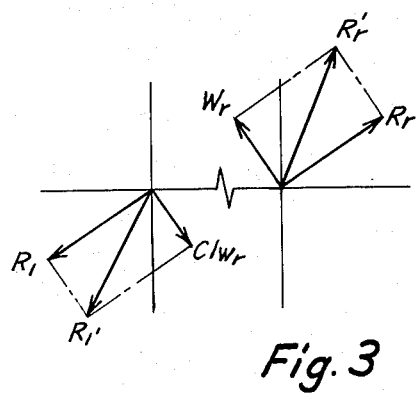
Fig. 3
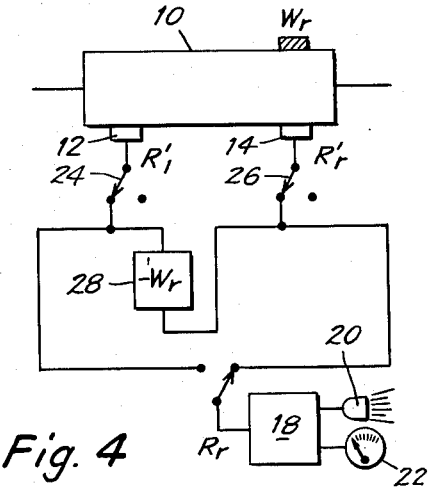
Fig. 4
Fig. 2
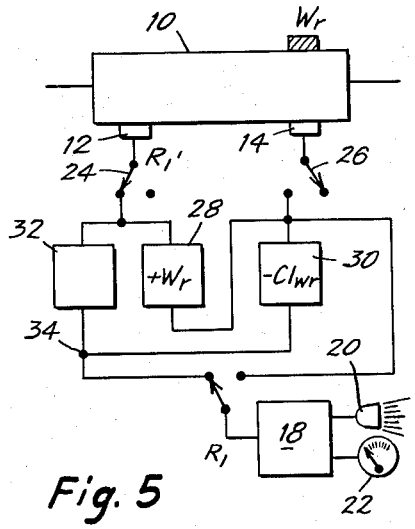
Fig. 5
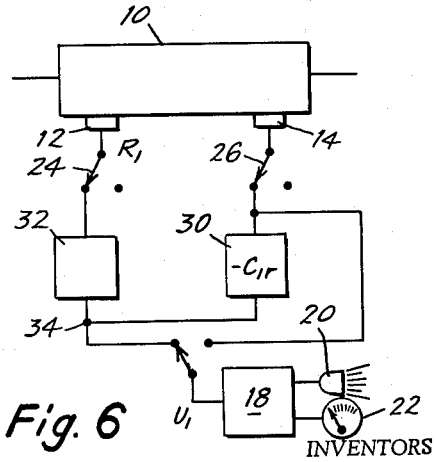
Fig. 6
INVENTORS
Glen H. Thomas, Theodore Ongaro
& Eugene R. Lucka,
BY Diggins + LeBlanc
ATTORNEYS INVENTORS
Glen H. Thomas, Theodore Ongaro
& Eugene R. Lucka, 3,143,888
PLANE RESOLVERS
Glen H. Thomas and Theodore Ongaro, Columbus, and Eugene R. Lucka, Hilliard, Ohio, assignors to International Research & Development Corp., Worthington, Ohio, a corporation of Ohio
Filed May 6, 1960, Ser. No. 27,305
18 Claims. (Cl. 73—462)

This invention relates to an improved electrical balancing machine and more particularly to an electrical balancing machine for indicating both the position and magnitude of unbalance of a rotor in two arbitrarily chosen planes.

Quantity production of rotors for dynamo-electric machines and for very high speed turbines and compressors now commonly used in rocket and missile production has brought about the need for faster methods of unbalance indication and correction. In addition to this, the high speed at which the latter types of rotors operate produces a necessity for a refinement of balance which was not heretofore encountered. In almost all instances, it is desirable to balance a rotor at its operating speed even where that speed is extremely high and it is desirable to be able to quickly balance different types of rotors without time consuming adjustment of the calibration of the balancing equipment.

In any two plane balancing method it is necessary to make some provision for assuring that the unbalance in one correction plane does not enter into the unbalance indication for the other correction plane (cross-effect) and, generally speaking, two methods have been utilized for accomplishing this end. In the older type equipment, the unbalance component in one correction plane is eliminated through the use of a specially designed flexibly restrained carriage pivoted about an axis or point contained in one of the two correction planes. With this system, which is theoretically accurate and is usable in many situations, it is impossible to produce high speed rotation of varying types and sizes of rotors in any practical carriages. The second system for eliminating "cross-effect" utilizes a compensating means which may be so adjusted as to electrically insure that the unbalance in one correction plane does not enter into the unbalance indication for the other correction plane. When such a system is properly adjusted it indicates separately the mass correction needed in each of the two planes for obtaining a dynamic balance of the rotor being analyzed.

While the latter type system does not require a special carriage and permits balancing at the operating speed of the particular rotor, the system must first be calibrated or compensated to establish cross-effect free operating conditions. Since calibration or compensation data of this type is difficult to determine by calculation, as a practical matter, such systems are almost always adjusted empirically, either by operating the system with a perfectly balanced rotor to which artificial unbalance masses of known magnitude are added, or by using an unbalanced rotor for calibration and first adjusting the analyzing system in such a manner as to electrically simulate a perfectly balanced rotor before the above-mentioned known artificial unbalance masses are added.

Both calibrating methods leave much to be desired. The requirements for a perfectly balanced rotor are exacting and expensive to achieve where high speed operation is necessary. The balance-simulating method, on the other hand, requires rather complicated and space demanding auxiliaries, such as signal generators for producing the balance simulating signals and, generally speaking, these generators serve no other useful purpose. In addition to this, a large number of test runs of the unbalanced rotor are generally necessary so that the method becomes increasingly time consuming as either the size or speed of the rotor is increased. As an example, in one very commonly used system, it is necessary to bring the rotor up to operating speed no less than five times in order to obtain even an initial balance.

According to the present invention it has now been found that it is possible to achieve balancing in an unpivoted carriage at normal rotor speed through electrical elimination of cross effect but with a marked reduction in both the amount of equipment necessary and the number of runs and amount of time necessary to complete the operation. The invention is characterized by both the simplified equipment and also the particular method in which that equipment is utilized to secure a quicker balance with a considerably reduced possibility of error. As a matter of fact, the method and equipment make it possible for a completely untrained operator to secure satisfactory rotor balance in a shorter period of time than would have been possible with the older and conventional electrical systems.

With respect to achieving a balance in one plane (after which balance can be secured in additional planes), the method of the invention comprises rotating a rotor while deriving therefrom at first and second spaced planes electrical signals which are functions of the vibrations of the rotor in those planes. A known weight is then added to the rotor at a known position proximate the first plane and the rotor again rotated. An additional signal component is now produced in both planes as a result of the addition of the known weight and this causes the resultant signals from both planes to be modified. The modified signal from the second plane is fed through a device for changing its phase and amplitude (an operator) and this is adjusted so that it produces a signal equal to the additional signal component from the first plane. The signal from this operator is then fed to a second operator to produce still a further signal equal and opposite to the additional signal component from the second plane (the cross-effect). The rotor is then stopped, the known weight is removed, and the rotor again brought up to speed. The signal from the first plane is now fed to the second operator and, since that operator was adjusted to eliminate the cross effect from the known weight when a signal equal to that produced by the known weight in the first plane was fed in, the second operator now produces a signal equal and opposite to the cross effect caused by the unknown unbalance in the first plane. The signal from the second operating means is then added to the signal from the second plane and cancels the cross-effect so that the resultant signal is an indication of the amount and position of unbalance in the second plane.

It is accordingly a primary object of the present invention to provide an improved balancing machine and method by means of which it is possible to quickly balance various types of rotors at their normal operating speed without the use of large amounts of equipment or the necessity of a skilled operator.

It is another object of the invention to provide an improved balancing device and method which makes it possible to balance various types of unbalanced rotors in a minimum number of runs without the necessity of utilizing a perfectly balanced rotor or of electrically simulating a perfectly balanced rotor.

It is another object of the invention to provide an improved balancing machine and method whereby it is possible to quickly balance various types of unbalanced rotors through the use of a conventional vibration analyzer and a pair of uniquely arranged amplitude and phase shifting operators which are capable of eliminating cross-effect.

It is another object of the invention to provide an improved balancing machine and method utilizing a pair of phase and amplitude shifting operators in conjunction with isolating networks capable of allowing the operators to be arranged to eliminate cross-effect without the necessity of using signal generators to simulate a perfectly balanced rotor.

It is still another object of the invention to provide an improved rotor balancing machine and method which is capable of being operated and carried out by unskilled personnel.

These and further objects and advantages of the invention will become more apparent upon reference to the following specification and claims and the appended drawings wherein:

FIGURE 1 is a diagrammatic representation of an unbalanced rotor having an electrical unbalance analyzer connectable to either of two transducers for responding to the unbalance in each of two planes;

FIGURE 2 is a vector diagram illustrating the unbalance forces in the rotor of FIGURE 1 and the electrical unbalance signals produced in the unbalance analyzer;

FIGURE 3 is a vector diagram similar to FIGURE 2 but showing the condition after a trial weight has been added to the rotor of FIGURE 1 in the right plane thereof;

FIGURE 4 is a diagrammatic illustration of the rotor with the trial weight added and showing the addition of a first operator unit between the transducers and the unbalance analyzer;

FIGURE 5 shows the rotor of FIGURE 4 still containing the unbalance weight and illustrates the addition of a second operator unit between the left transducer and the unbalance analyzer;

FIGURE 6 shows the rotor with the trial weight removed and with the unbalance indicator indicating the true unbalance in the left plane;

Figure 7:
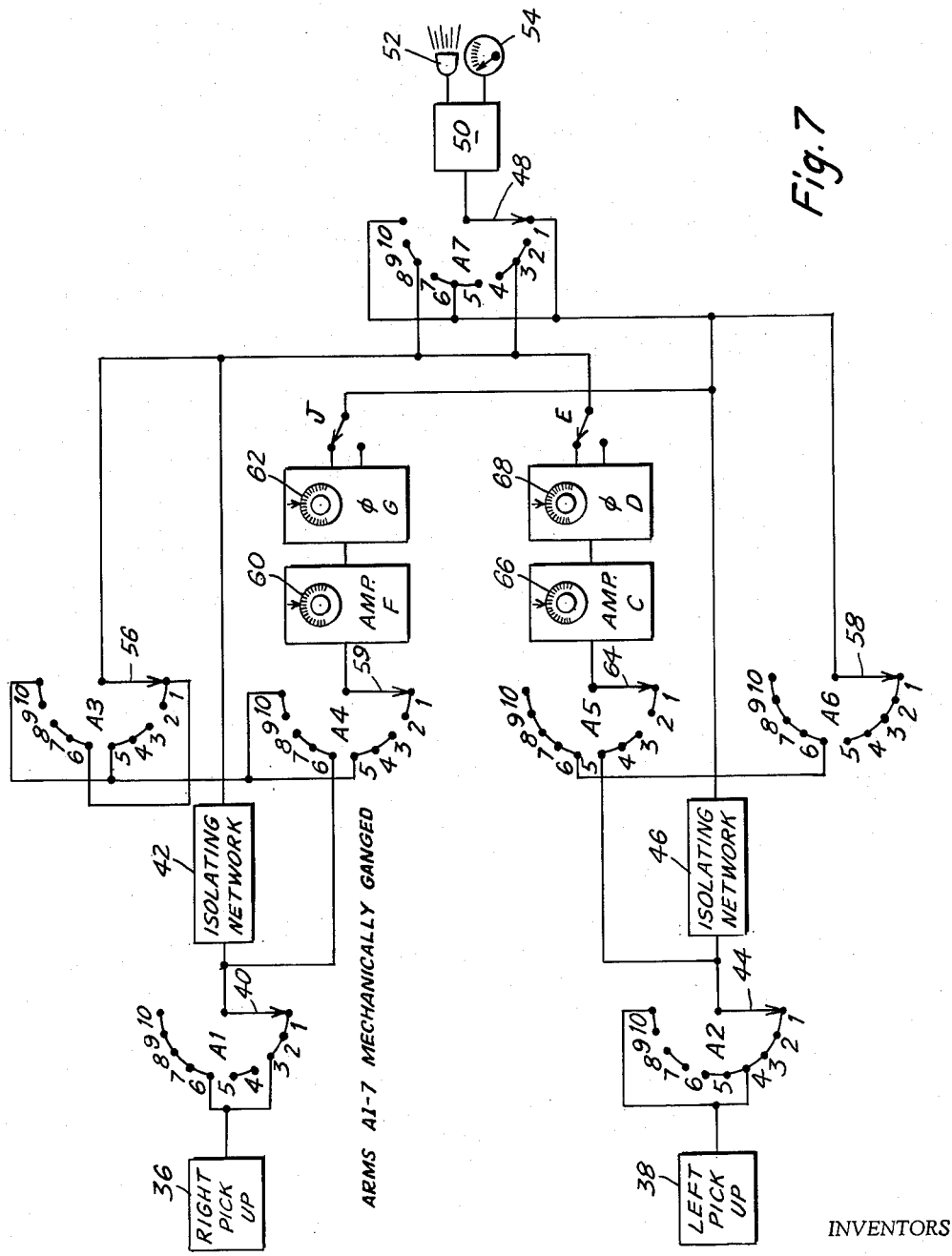
FIGURE 7 is a diagrammatic illustration of a balancing machine constructed according to the present invention.

A rotor is in balance if the rotation of its mass causes no force reaction on its bearings, although balancing operations are usually directed toward reduction of vibration rather than directly toward reduction of force reaction. In rotors in which any sort of nonsymmetries may exist unbalance corrections must be made at as many locations (planes) along the axis of rotation as there are bearings at which it is desired to eliminate vibration. The location of those correction planes is quite arbitrary so long as the vibration at each chosen location at which the vibration is to be eliminated is effected by a correction in at least one correction plane.

In a linear system wherein a force of a given frequency acting at a given point in a given direction produces motions which are proportional to the force, an unbalance mass in one plane will produce a vibration in that plane and will also produce a cross effect vibration in a second plane which is related to the vibration in the first plane by a fixed ratio of both amplitude and phase. The fixed nature of this relationship has been the basis of electrical devices for eliminating cross effect in balancing operations, as is described in Baker et al. Patent No. 2,165,024. The instant method and apparatus also is dependent upon this relationship but in a manner which produces results which are markedly superior to those achieved heretofore.

Turning to the figures of the drawings and most particularly to FIGURE 1, an unbalanced rotor 10 is mounted in suitable bearings and is driven at approximately normal rotating speed. A pair of transducers or pick-ups 12 and 14 are arranged to pick-up vibrations from the rotor in two spaced planes and to produce alternating current electrical signals which are representative of these vibrations. The transducers 12 and 14 are connected through a selector switch 16 to a suitable vibration analyzing unit 18 which is equipped with a flashing light 20 and amplitude indicating meter 22. The analyzing unit 18 may be of any suitable type adapted to indicate both the amplitude and phase of vibration detected by thet transducers and one such suitable unit is described in detail in Ongaro Patent No. 2,711,647.

Assuming rotor 10 to be unbalanced, its rotation at its normal operating speed will produce an unbalance force in the left plane which in turn produces an alternating current signal output from the transducer 12 which is indicated by the vector $U_1$ in FIGURE 2. In a similar fashion the unbalance also produces an unbalance signal from the right transducer 14 which is indicated at $U_r$ in FIGURE 2. The signal $U_1$ in the left plane produces a cross effect in the right plane indicated at $C_{r1}$ while the unbalance in the right plane produces a cross effect in the left plane indicated as $C_{1r}$. The transducer 12 sums the signals $U_1$ and $C_{1r}$ to produce a resultant output $R_1$, while the transducer 14 acts in a similar manner to produce a resultant output $R_r$. It is these resultant outputs $R_1$ and $R_r$ which trigger the flashing light 20 and actuate the amplitude indicating meter 22. While it is possible to utilize these resultant signals to balance a rotor by means of a "cut-and-try" approach, this is time consuming and tedious and frequently requires a considerable amount of experience and skill on the part of the operator.

Referring now to FIGURE 4, if a known trial weight $W_r$ is added to the rotor 10 in the right plane at a known position, the transducers 12 and 14 produce signals which are illustrated in FIGURE 3. Thus, referring to the right plane, the right transducer 14 previously produced the signal $R_r$. However, $W_r$ has now been added to this to produce a new resultant $R_r'$. $W_r$ in turn produces a cross effect $C_{1wr}$ in the left plane to produce a new resultant $R_1'$ as an output of the transducer 12. The outputs from the transducers 12 and 14 are fed through a pair of selector switches 24 and 26 to a network which will now be described.

If the output $R_1'$ of transducer 12 is fed to an operator unit 28 it is possible to produce a signal which is equal to but 180° removed from $W_r$, i.e., minus $W_r$. This signal is mixed with the output from the transducer 14 and fed to the analyzing unit 18. Referring to FIGURE 3 it will be seen that if $-W_r$ is added vectorially to $R_r'$ the result is to return the output being fed to the analyzing unit 18 from $R_r'$ to $R_r$ despite the fact that the trial weight $W_r$ has been added. A simple method of accomplishing this is to simply add the trial weight and then adjust the phase and amplitude controls of the operator unit 28 until the reading of the analyzing unit 18 returns to that which was obtained before the trial weight was added.

At this stage, a known weight has been added to the rotor in the right plane at a known position and has produced an observable change in indication of the analyzing unit from $R_r$ to $R_r'$. This makes it possible to observe and record the lag angle in the right plane as well as to calibrate the amplituding indicating meter 22 for the right plane. That is to say, the phase position indicated by the firing of light 20 is displaced from the physical locus of the unbalance mass at the time of firing by an angle which is commonly referred to as the lag angle and which is peculiar to the particular rotor and test set-up. The angle remains constant with that particular rotor and test set-up so that once this angle has been observed it is possible to subsequently utilize the information to find the actual physical locus of an unbalance mass through a knowledge of the phase position indicated by the light 20.

Referring now to FIGURE 5, the selector switch 26 connected to the right transducer 14 is now switched to eliminate the signal of that transducer. Let it be considered that the operator unit 28 of FIGURE 4 is provided with an internal switch which brings about a 180° phase shift and that this switch is now actuated so that the operator unit 28 in FIGURE 5 produces an electrical signal equal to $+W_r$. A second operator unit 30 is now added to the equipment and has its input connected to the output of the first operator unit 28 and its output connected to the analyzer 18. An isolating unit or network 32 is connected between the output of the transducer 12 as it leaves switch 24 and the output of the operator unit 30 in order to permit mixing of the output of the transducer 12 with the cascaded outputs of the operator units 28 and 30 without creating a reaction on the input to the first operator unit 28, as will be described in more complete detail hereinafter.

At this time the transducer 12 is producing the signal $R_1'$ and this signal is fed through the isolating unit 32 to the junction point 34 in FIGURE 5. This same signal $R_1'$ is also transformed by the first operator unit 28 into a signal $+W_r$ and this is fed to the second operator unit 30 to produce a signal $-C_{1wr}$. The signal $-C_{1wr}$ is then mixed with the signal $R_1'$ at the junction point 34 so that the signal actuating the analyzing unit 18 is the original resultant unbalance signal $R_1$ of FIGURE 2.

If the foregoing manipulations are now considered it will be observed that the right operator unit 30 in FIGURE 5 has been adjusted to eliminate the cross effect of the weight $W_r$ without either utilizing or simulating a perfectly balanced rotor.

Referring now to FIGURE 6, the trial weight $W_r$ is removed as is the first operator unit 28. The output of the left transducer 12 is connected direct to the junction point 34 while the output of the right transducer 14 is fed through the second operator unit 30 to the same junction point. Since the operator unit 30 has been adjusted to operate upon the signal from the right transducer 14 so as to balance out the cross effect signal in the left plane, the analyzing unit 18 now responds to the true unbalance signal $U_1$ in the left plane. If the amplitude meter 22 is calibrated for that plane and if the leg angle is also known, it is then possible to balance the rotor to eliminate the unbalance which causes the signal $U_1$.

The description thus far has been of a simplified elimination of unbalance at one end of a rotor and the illustrations in FIGURES 1, 4, 5 and 6 have been simplified to eliminate unused components for clarity of discussion. Actually, it is necessary to balance both ends of the rotor and components not utilized in a given step are obviously simply switched out of the circuit. A complete test set-up for balancing both ends of a rotor including a suitable switching arrangement will now be described in connection with the diagrammatic illustration of FIGURE 7.

Referring to FIGURE 7, a pair of transducers or pickups 36 and 38 are connected to the contacts on the A1 and A2 decks of a 7-deck rotary selector switch A, the right transducer 36 being connected to A1 contacts 1–3 and 6–10 and the transducer 38 being connected to A2 contacts 1–6, 9 and 10. The swinger or movable arm 40 of deck A1 is connected to an isolating network 42 while the swinger 44 of deck A2 is connected to an isolating network 46. The output of isolating network 42 is connected to contacts 2, 3, 4, 8 and 9 of deck A7, while the output of isolating network 46 is connected to contacts 1, 5, 6, 7 and 10. The swinger 48 of deck A7 is connected to an analyzing unit 50 which actuates a light 52 and amplitude meter 54 in the manner previously described.

The deck A3 has its swinger 56 connected to the output of its associated isolating network 42 while the swinger 58 of deck A6 is connected to the output of its isolating network 46. Contacts 1, 2, 6, 7 and 8 of deck A3 are connected in common. Contacts 3, 4, 5, 9 and 10 are also connected in common with one another and with the corresponding contacts on deck A4. Contacts 1 and 2 of deck A4 are connected together while contacts 6, 7 and 8 are connected to the swinger 40 of deck A1. Swinger 59 of deck A4 is fed to an operator unit consisting of series connected amplitude unit F and phase unit G. These units are provided with suitable control dials 60 and 62 so that their adjustments may be indicated and recorded. The output of phase unit 62 is fed to a 180° phase reversing switch H and thence to the output of isolating network 46.

Contacts 1–5 of deck A6 are connected in common while contacts 6–10 of that deck are connected to the corresponding contacts of deck A5. Contacts 1 and 2 of deck A5 are connected together while contacts 3, 4 and 5 are connected to the swinger 44 of deck A2. Swinger 64 of deck A5 is connected to a second operator unit consisting of amplitude unit C and phase unit D having dials 66 and 68. The output of phase unit D is fed through a 180° phase reversing switch E to the output of the isolating network 42. The amplitude and phase units F and G are referred to as the right operator channel while the units C and D are known as the left operator channel.

The swingers of all decks A1 through A7 of the selector switch A are mechanically ganged and the unit is arranged so that a complete balancing operation may be carried out by sequentially switching through the ten switch positions while performing other manipulative steps now to be described. With the rotary switch A in position 1 the rotor is brought up to speed. The left transducer 38 feeds an output signal to the analyzing unit 50 through deck A2, swinger 44, isolating network 46, deck A7 and swinger 48. The right transducer or pickup 36 is at this time disconnected from the analyzer at decks A4 and A7. The analyzing unit 50 will now produce a reading of $R_1$ both in phase and amplitude and this reading is recorded.

The rotary switch is now advanced to position 2. The right transducer 36 now actuates the balance analyzer 50 through deck A1, swinger 40, isolating network 42, deck A7 and swinger 48. The left transducer 38 is disconnected at decks A5 and A7. The balance analyzer thus provides an indication of $R_r$ which is recorded.

The rotor is now stopped.

The rotary switch is advanced to position 3 and a trial weight $W_r$ of known weight is attached to the right plane of the rotor at a known position. Both the amount of the weight and the position of $W_r$ are recorded. The dial 60 on the amplitude unit F is turned fully counterclockwise to prevent any signal from feeding through the right channel and the rotor is again brought up to speed. At this time, the right transducer 36 feeds a signal to the balance analyzer 50 through deck A1, swinger 40, isolating network 42, deck A7 and swinger 48. The right transducer also feeds an input signal to the right operator channel through deck A1, swinger 40, isolating network 42, swinger 56, deck A3, deck A4 and swinger 59, but the channel does not produce an output since the amplitude control 60 of amplitude unit F was previously turned fully counterclockwise, i.e., to zero.

The left transducer 38 is disconnected from the balance analyzer 50 at A7, but feeds an input to the left operator channel through deck A2, swinger 44, deck A5, and swinger 64 and the output of this left operator channel is mixed with the output of the right transducer at contact 3 of deck A7. If the amplitude control 66 of amplitude unit C in the left operator channel is set fully counterclockwise, the only signal fed to the balance analyzer 50 is the output of the right transducer 36 which, with the trial weight attached, is the signal $R_r'$ in FIGURE 3.

Controls 66 and 68 of the amplitude and phase units C and D of the left operator channel are now adjusted to cause the balance analyzer 50 to produce the same phase and amplitude reading as were recorded at position 2 of the selector switch. It will be recalled that at that position the balance analyzer 50 indicated the signal $R_r$. Thus, when controls 66 and 68 of amplitude and phase units C and D have been rotated to bring the reading of the analyzer 50 back to this same indication the left operator channel is producing the signal $-W_r$ to balance out the signal from the trial weight $W_r$ in the right channel. No additional record is made at this time.

The rotary switch is now advanced to position 4, the controls 66 and 68 of amplitude and phase units C and D in the left operator channel are left untouched, but phase reversing switch E in that channel is switched to reverse the phase of the output. The left transducer is disconnected from the balance analyzer 50 at deck A7 but feeds an input to the left operator channel through deck A2, swinger 44, deck A5 and swinger 64, so that the left operator channel produces an output signal equal to $+W_r$. This signal is fed to the balance analyzer 50 from switch E through deck A7 and swinger 48. The right transducer 36 is disconnected at deck A1. The balance analyzer 50 now indicates $+W_r$ and, since the amount of the trial weight is known and its physical locus of attachment is also known, it is now possible to calibrate the balance analyzer for the right plane both as to amplitude and lag angle. The reading of the balance analyzer in both amplitude and phase is recorded.

The rotary switch is now moved to contact 5 as the rotor continues to run with the trial weight $W_r$ attached. The left transducer 38 feeds the balance analyzer 50 through deck A2, swinger 44, isolating network 46, deck A7 and swinger 48. The left transducer also feeds an input to the left operator channel through deck A2, swinger 44, deck A5 and swinger 64. The right transducer 36 is disconnected at deck A1. The controls of the left operator channel are allowed to remain as they were in the preceding position of the rotary switch so that the left operator channel produces the signal $+W_r$. This signal is fed to the input of the right operator channel through swinger 56 of deck A3, deck A4, and swinger 59.

With the amplitude control 60 of amplitude unit F set fully counterclockwise so that no signal is fed through the right operator channel, the balance analyzer 50 reads the output of the left transducer 38 which at this time is $R_1'$ in FIGURE 3. The amplitude and phase controls 60 and 62 of amplitude and phase units F and G in the right operator channel are now adjusted until the reading of the balance analyzer 50 is returned to the reading which was obtained in switch position 1, at which time the reading $R_1$ was obtained. Since the input to the right operator channel is $+W_r$ and the channel is being adjusted to eliminate the cross effect of the $+W_r$ in the left plane, it is obvious that the adjustment of amplitude unit F and phase unit G is eliminating the cross effect of the trial weight on the left plane. The setting of controls 60 and 62 of amplitude and phase units F and G and the setting of switch J are recorded since these settings can now be used to separate out the left plane.

The purpose of the isolating network 46 will now be apparent. That is to say, the output from the right operator channed is mixed with the output of the left transducer 38 at the output of the isolating network so as not to modify the input signal to the left operator channel consisting of amplitude and phase units C and D. Any modification of the input signal to these units would destroy the $+W_r$ signal being fed to the right operator channel and prevent proper adjustment of that channel for plane separation. The rotor is now stopped and the second run has been completed.

The rotary switch is now moved to position 6, the trial weight is removed from the right plane of the rotor and a known trial weight is attached to the left plane at a known position. The amount of the weight and its position are recorded and the rotor is again brought up to operating speed. Amplitude control 66 of amplitude unit C in the left operator channel is now turned fully counterclockwise to prevent any signal feed through this channel. The left transducer 38 feeds a signal to the balance analyzer 50 through deck A2, swinger 44, isolating network 46, deck A7 and swinger 48. The right transducer 36 is disconnected from the balance analyzer 50 at deck A7 but is connected to the right operator channel through deck A1, swinger 40, deck A4 and swinger 59. With the amplitude control 60 of amplitude unit F in the right operator channel also fully counterclockwise the balance analyzer 50 would read simply the output of the left transducer 38 which now would include the trial weight $W_1$. The controls 60 and 62 of the amplitude and phase units F and G of the right operator channel are now adjusted to bring the indication of the balance analyzer 50 to that which was obtained at switch position 1 or $R_1$. At this time the right operator channel and its amplitude and phase units F and G are producing the signal $-W_1$ to balance out the trial weight in the left operator channel. No records need be made at this time.

The rotary switch is now rotated to position 7. The left transducer 38 is now disconnected at deck A2 while the right transducer 36 continues to feed the right operator channel through deck A1, swinger 40, deck A4 and swinger 59. The output of the right operator channel and its amplitude and phase units F and G in turn feed the balance analyzer through deck A7 and swinger 48. The phase reversal switch J in the right operator channel is now reversed so that the balance analyzer 50 indicates $+W_1$. It is now possible to calibrate the balance analyzer for the left plane both as to amplitude and lag angle since the weight of $W_1$ and its physical position are known. The reading of the balance analyzer both in amplitude and phase is recorded.

The rotary switch is now advanced to position 8 as the rotor continues rotating with the trial weight $W_1$ attached. The right transducer 36 now feeds a signal direct to the balance analyzer 50 through deck A1, swinger 40, isolating network 42, deck A7 and swinger 48. The right pickup also feeds an input to the right operator channel through deck A1, swinger 40, deck A4 and swinger 59. The output of the right operator channel in turn is fed to the input of the left operator channel through reversing switch H, swinger 58 of deck A6, deck A5 and swinger 64. The output of the left operator channel passes through reversing switch E and is mixed with the output of the right transducer 36 at contact 8 of deck A7.

The right operator channel and amplitude and phase units F and G are now feeding the signal $+W_1$ to the left operator channel and controls 66 and 68 of amplitude and phase units C and D are adjusted so that the balance analyzer 50 indicates the same reading that was obtained at switch position 2, at which time the balance analyzer read $R_r$. The cross effect of $W_1$ has thus been cancelled and the left operator channel is now adjusted to separate the right plane. The setting of controls 66 and 68 of amplitude and phase units C and D and of switch E are recorded.

The switch A is now advanced to position 9 as the rotor continues to rotate with the trial weight $W_1$ attached. The right transducer now feeds the balance analyzer 50 through deck A1, swinger 40, isolating network 42, deck A7 and swinger 48. The left transducer 38 is disconnected from the balance analyzer 50 at deck A7 but feeds an input to the left operator channel through deck A2, swinger 44, isolating network 46, swinger 58 of deck A6, deck A5 and swinger 64. The setting of controls 60, 62 of amplitude and phase units F and G and controls 66, 68 of amplitude and phase units C and D and switches J and E are set at the positions recorded and determined at switch positions 5 and 8 respectively. This sets up both operator channels for plane separation. The balance analyzer 50 now indicates the unbalance $U_r$ and this is recorded in both phase and amplitude.

The switch is now rotated to position 10 as the rotor continues to run with the trial weight $W_1$ attached. At this position the right transducer is disconnected from the balance analyzer 50 at deck A7 but feeds an input to the right operator channel through deck A1, swinger 40, isolating network 42, swinger 56 of deck A3, deck A4, and swinger 59. The left transducer is connected to the balance analyzer 50 through deck A2, swinger 44, isolating networks 46, deck A7 and swinger 48. With the controls and switches in the two operator channels set as in the preceding switch positions, the balance analyzer now reads $U_1'$. The prime designation is used here since the unbalance of the rotor in the left plane is being indicated with the trial weight attached. It will be apparent to those skilled in the art that the rotor may be balanced with the trial weight attached and this is preferably done since it eliminates the necessity for stopping the rotor to remove the trail weight. The indication of the balance analyzer is recorded in both phase and amplitude.

The rotor is now stopped and all of the information necessary to to eliminating the unbalance has been obtained.

In switch position No. 4 the meter 54 of the balance analyzer 50 read the amplitude of unbalance produced by the trial weight $W_r$ whose weight was recorded at switch position 3. If the known weight is now divided by the meter reading and the quotient multiplied by the amplitude reading obtained at switch position 9, the resulting product is the amount of mass unbalance in the right plane. Similarly, if the meter reading recorded at switch position 7 is divided into the trial weight $W_1$ recorded at switch position 6, and this quotient multiplied by the amplitude recorded at switch position 10, the product is the mass unbalance in the left plane.

At switch position 3 the trial weight $W_r$ was placed at a known physical locus and at switch position 4 the electrical indication of this phase position was determined. Similarly, in switch position 6 the tral weight $W_1$ was placed in a known locus and the electrical indication of this was obtained at switch position 7. The lag angle for both the right and left planes is therefore known so that the exact locus of the unbalance mass in both planes has now been fully determined. The rotor may now be balanced by removing weights at these positions or by adding weights of like amounts 180° away from these positions.

It will be seen that rotor balance can be secured through but three runs of the rotor and that all of the manipulative steps may be reduced to simple directions as to the setting of switches and controls and the recording of phase and amplitudes indications. It is not necessary that the operator be experienced in balancing operations or even that he be familiar with the theory involved so long as he is capable of accurately following directions. No signal generators are necessary in this procedure and all of the equipment which is utilized is similar to that which is already available in current instruments for the purpose of plane separation. The method and apparatus of the invention thus makes accurate balance possible in a lesser period of time than heretofore necessary and with a smaller amount of simpler equipment.

Figure 8:
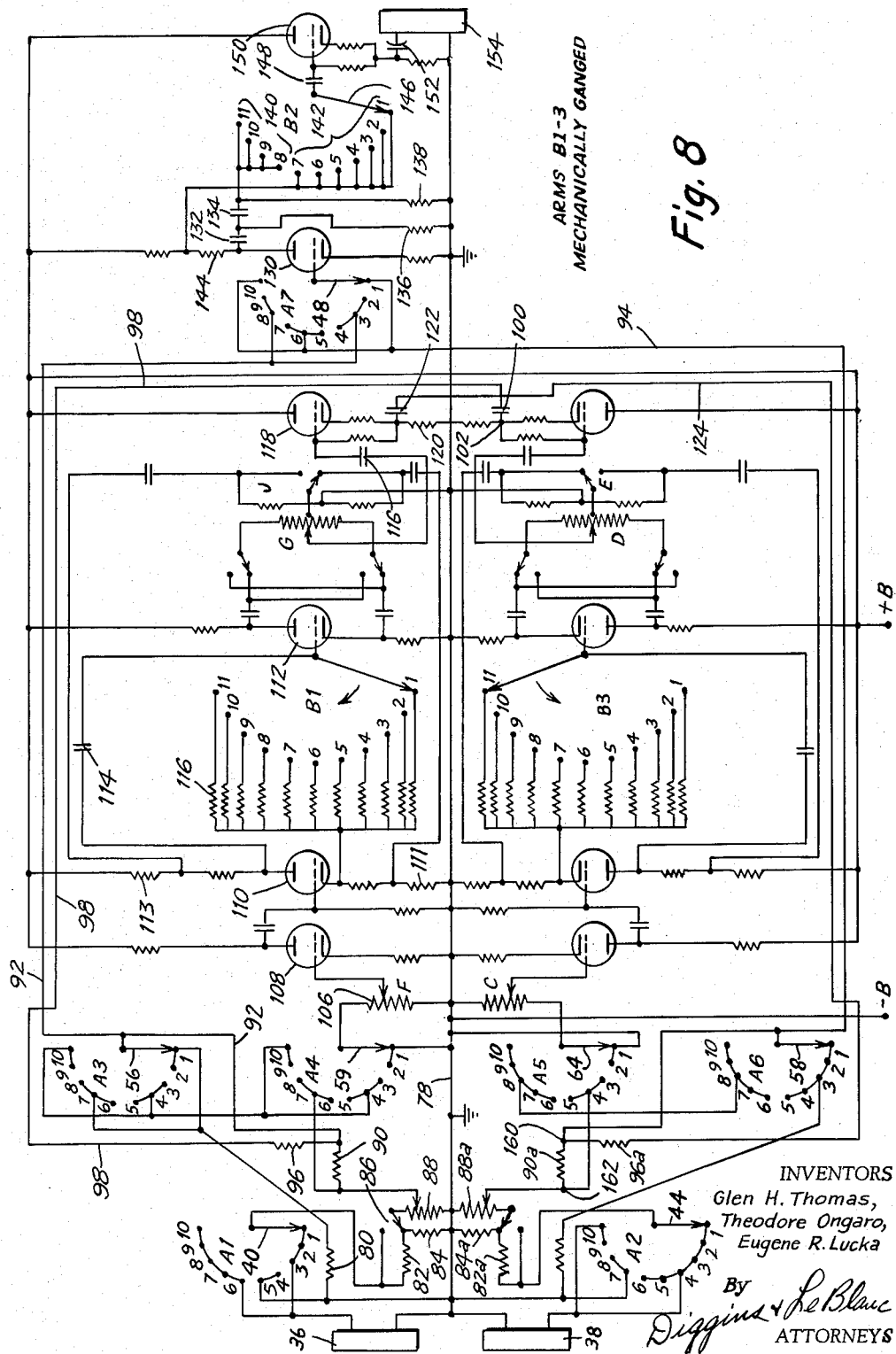
FIGURE 8 is a schematic diagram showing an actual embodiment of the device of FIGURE 7.

While the equipment of the invention has been illustrated in FIGURE 7 in the form of block diagrams and is thought to be clear to one skilled in the art, a specific embodiment is illustrated in detail in FIGURE 8. Referring to that figure, the pair of pickups 36 and 38 are respectively associated with switching arrangements and amplitude and phase circuitry similar to that found in FIGURE 7. Since the right (upper) and left (lower) operator channels are identical only the right unit will be explained in detail.

One terminal of the right transducer 36 is connected to the ground bus 78 while the other terminal is connected to contacts 1–3 and 6–10 of deck A1 of the rotary switch. Contacts 4 and 5 of this deck are connected to the ground bus 78 and through a relatively high value resistor 80 to contacts 1, 2, 6, 7 and 8 of deck A3. Contacts 3, 4, 5, 9 and 10 of deck A3 are connected to corresponding contacts of deck A4 as in the simplified embodiment of FIGURE 7. Contacts 1 and 2 of deck A4 are grounded to the ground bus 78.

Swinger 40 of deck A1 is connected to a pair of attenuation resistors 82 and 84 and an attenuation selector switch 86 is connected to select a voltage either above or below resistor 82. The output from switch 86 is connected across an amplitude control variable resistor 88 which is utilized to balance the right and left channels to provide equal responses for equal transducer inputs. The center conductor of variable resistor 88 is fed through a resistor 90 and conductor 92 to contacts 2, 3, 4, 8 and 9 of the deck A7 of the rotary switch. The remaining contacts 1, 5, 6, 7 and 10 of this switch are similarly connected by a conductor 94 to a corresponding resistor in the left channel of the unit. The output side of the resistor 90 is connected through a further resistor 96, conductor 98 and coupling capacitor 100 to the output of the left channel at 102.

The swinger 59 of deck A4 is connected to a variable resistor 106 which forms the amplitude control F of the right operator channel. The center or variable contact of this resistor is connected to the input of a triode amplifier stage 108 which drives a further triode 110. Triodes 110 and 112, variable resistor G and reversing switch J comprise a phase shift unit capable of providing 360° of phase shift. The coupling capacitor 114 between the plate of triode 110 and grid of triode 112 and the resistors 116 provide a constant 90° phase shift regardless of the input frequency. Triode 112 provides voltages of +180° and −180° at the ends of resistor G and a voltage selected by the variable tap on this resistor is added to the voltage across either resistor 111 or 113 in the circuit of triode 110. In this manner a full 360° phase shift is available at substantially constant voltage throughout the phase shift range. The deck B1 of a speed selector switch B is provided in order to select the proper resistor 116 in order to obtain the previously discussed 90° phase shift at any speed of the test machine.

The output of the phase shift unit is fed through a coupling capacitor 117 to the grid of a cathode follower 118. An output is taken from the cathode resistor 120 of this tube through coupling capacitor 122 and is fed via conductor 124 to the resistor 96a in the left channel which corresponds to the resistor 96 in the right channel.

The swinger 48 of deck A7 of the rotary switch A is connected to the grid of a triode amplifier 130. The output of this tube is fed through a filter network consisting of capacitors 132 and 134 and resistors 136 and 138 which are connected to the last four contacts 140 of deck B2 of the speed selector switch B. The remaining contacts 142 of this switch are connected to the load resistor 144 of triode 130. As the swinger 146 of deck B2 of speed selector switch B is moved in a clockwise direction, the filter between tubes 110 and 112 is adjusted for higher speeds. The filter network 132, 134, 136 and 138 following amplifier 130 is a high-pass filter for eliminating tube noise at low frequencies when the speed selector switch is set for high speeds.

The swinger 146 of deck B2 of speed selector switch B is fed through a coupling capacitor 148 to a final cathode follower 150 whose output is delivered through a coupling capacitor 152 to the output terminals 154. A suitable balance analyzer is connected to these output terminals for indicating the phase and amplitude of unbalance as described previously.

Referring to FIGURE 7, an isolating network is shown at 42 and has been discussed as necessary in order to prevent undesirable reaction between the voltage from the transducer and the voltage which has been operated on by both operator channels. To illustrate, consider the apparatus of FIGURE 7 (or the apparatus of FIGURE 8) with the rotary switch A in position 5. At this time the right transducer is disconnected and the left transducer is delivering a signal to the balance analyzer through the isolating network and is also delivering a signal to the left operator channel (amplitude adjuster C and phase shifter D). The output of phase shifter D in turn is being fed into the right operator channel (amplitude adjuster F and phase shifter G) and this is being mixed with the output of the left transducer at contact 5 of deck A7 of the selector switch. The left operator channel consisting of amplitude adjuster C and phase shifter D is producing the signal $+W_r$ and this is being operated on by the right operator channel to eliminate the cross effect of $W_r$ in the left plane. If the voltage from the right operator channel were mixed with the output of the left transducer in such a way as to modify the voltage input to the left operator channel it would obviously upset the $+W_r$ value and destroy the validity of the compensation. Considering FIGURE 8, the isolating network will be discussed in connection with the left (lower) channel and resistors therein are numbered identically with those previously described in the right channel but with the suffix "a."

The right operator channel operates on the $+W_r$ voltage to produce $-C_{1wr}$ and this is delivered through resistor 96a to the junction point 160 between resistors 96a and 90a. This voltage appears across resistor 90a connected in series with the parallel combination of resistors 84a and 88a which are also in parallel with the left transducer. The value of resistor 90a is made at least fifty times as great as the resistance of the parallel combination of resistors 84a, 88a and the transducer, one set of illustrative values being as follows:

R90a ------------------------------------ 470K
R88a ------------------------------------ 100K
R84a ------------------------------------ 11K

Under these circumstances, a voltage at junction 160 of approximately the same magnitude as the voltage from the pickup which appears at 162 has a negligible effect upon the voltage at junction 162.

The operation of the specific embodiment of the invention shown in FIGURE 8 is identical to that previously described in connection with the diagrammatic illustration of FIGURE 7. Since the switch connections are the same, the steps enumerated in detail in connection with FIGURE 7 will produce similar operation in the specific embodiment illustrated in FIGURE 8.

The plane resolver of this invention is thus seen to require substantially no more equipment than the operator channels necessary to achieve plane separation according to prior older methods of balancing. The particular sequence of steps, however, and the particular switching arrangements and manner of using the equipment permit balancing in a shorter period of time than heretofore possible and without the necessity of generators for producing signals useful for simulating a balanced rotor. The equipment is susceptible of embodiment in a quite small cabinet and one possible arrangement is illustrated in FIGURE 9.

Referring to that figure, the controls and switches are designated by the same numbers as are found in FIGURE 7. The cabinet 164 in which the unit is housed has a hinged cover 166 and this may be provided with a pair of phase calculators for simplifying the application of the balancing weights. Thus, a scale 168 is supplied with suitable marking 0–360 and has a first arm 170 pivoted thereon at 172. The upper end of this arm is provided with an index marker 174 and is marked "H" and the other end of this arm is provided with an index marker 176 and is marked "L." A second arm 178 is also pivoted at 172 and provided with an index marker 180 designated "R."

The end H of arm 170 is placed at the physical locus that the trial weight $W_r$ was added in switch position 3 in the description of the operation of the unit of FIGURE 7. The end R of arm 178 is then set at the phase position electrically indicated for this weight in switch position 4 in the description of operation of the apparatus of FIGURE 7. The angle between H and R then constitutes the lag angle. If both arms are now rotated together until R is at the electrically indicated phase of unbalance in switch position 9 in the description of the apparatus of FIGURE 7, the end H will be at the actual locus of the unbalance mass. The arm L, being 180° removed therefrom, will then indicate the position of weight addition in order to secure balance. The right phase calculator may be used in a similar manner to indicate the actual position for weight addition to the other plane, or alternatively, only one phase calculator need be provided.

Figure 9:
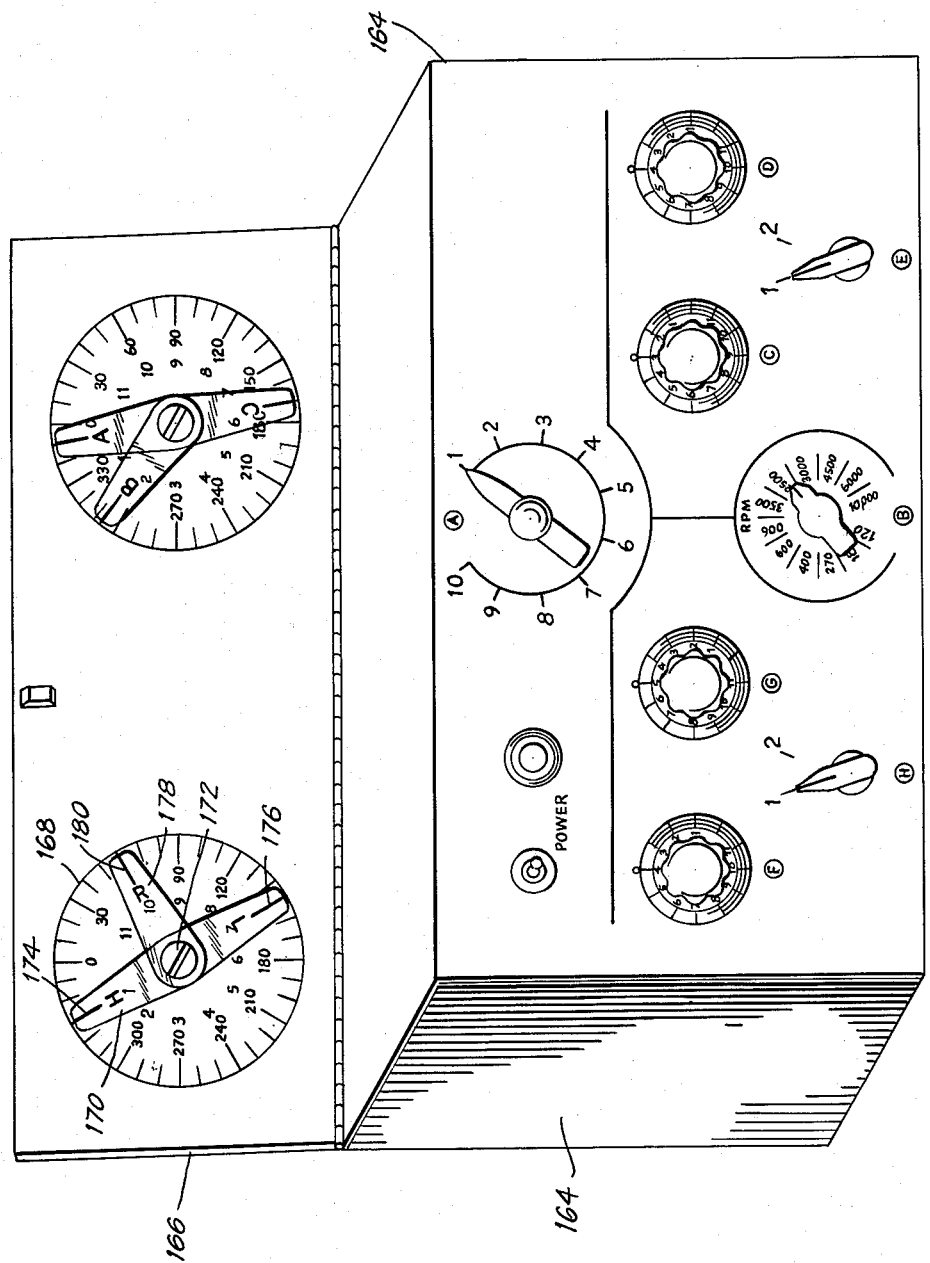
FIGURE 9 is a perspective elevation of a unit of the type shown in FIGURES 7 and 8 showing correction weight and position calculators mounted on the cover thereof.

With a unit such as is illustrated in FIGURES 7, 8 and 9 the procedure for balancing an unbalanced rotor is extremely simple and can be put into such a form that a completely unskilled operator could successfully secure a very adequate balance. As an illustration of the simple and concise nature of the procedure involved, the following directions and data sheets constitute all that is necessary to carry out the balance operation.

The following ten steps apply to the ten switch positions of A. Start with position 1 and record the data indicated at the respective steps.

(1) Start unbalanced rotor. Record amplitude and phase. 13.0 mils, 88°.

(2) Record amplitude and phase. Stop rotor. 46.0 mils, 40°.

(3) Apply known trial weight on right plane. Record the amount and the physical phase position of the trial weight. Start rotor. F fully counterclockwise. Adjust C and D until amplitude and phase read data 2. (If necessary switch E to other position.) 20.0 grams, 0°.

(4) Switch E to other position. Record amplitude and phase. 24.5 mils, 242°.

(5) Adjust F and G until amplitude and phase read data 1. (If necessary switch J to other position.) Record F, G, and J control settings. Stop rotor. F—8.54, G—2.16, J—2.

(6) Remove right plane trial weight. Apply known trial weight on left plane. Record the amount and the physical phase position of trial weight. Start rotor. C fully counterclockwise. Adjust F and G until amplitude and phase read data 1. (If necessary switch J to the other position.) 20.0 grams, 270°.

(7) Switch J to the other position. Record amplitude and phase. 26.3 mils, 147°.

(8) Adjust C and D until amplitude and phase read data 2. (If necessary switch E to other position.) Record C, D and E control settings. C—6.20, D—5.08, E—1.

(9) Return controls F, G and J as in data 5. Controls C, D and E as in data 8. Record amplitude and phase. 56.0, 42°.

(10) Record amplitude and phase. Stop rotor. 39.6 mils, 107°.

*Balance Weights*

The following computations are required to determine the balance weights and locations thereof from the data derived in steps 1 to 10.

(A) Divide data 4 (mils) into data 3 weight). Record. 0.816, Right Calibration.

(B) Divide data 7 (mils) into data 6 (weight). Record. 0.760, Left Calibration.

(C) Multiply B by data 10 (amplitude). Record. 30.0, Left Balance Weight.

(D) Multiply A by data 9 (amplitude). Record. 45.6, Right Balance Weight.

*Balance Weight Phase Location*

(I) Place arm H at the phase position recorded in data 3 and arm R at data 4.

(II) Now move both arms until R is at data 9 phase. Read light spot phase on arm L and record. 340°, Right Balance Weight Location.

(III) Place arm H at the phase position recorded in data 6 and arm R at data 7.

(IV) Now move both arms until R is at data 10 phase. Read light spot phase on arm L and record. 50, Left Balance Weight Location.

It will be apparent from the foregoing that the balancing procedure does not require any particular knowledge of the theory of rotor balance nor of the operation of the balancing apparatus. Any unbalanced rotor can be balanced in three runs. It will also be obvious that while specific circuitry for the operator channels has been illustrated by way of a specific example other equivalent circuitry can be utilized and is known for accomplishing the same electrical results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A balancing machine adapted to be connected to a first transducer mounted for response to vibration of a rotor in a first plane and to a second transducer mounted for response to vibration of said rotor in a second plane, to deliver an output to an analyzer means capable of providing an amplitude and phase indication of the vibration actuating the transducers; comprising a first operator means capable of varying the phase and amplitude of an alternating current signal, a second operator means capable of varying the phase and amplitude of an alternating current signal, and switch means for connecting said second transducer to said analyzer means and to the input of said first and second operator means connected in cascade and connecting the output of the operator means to said analyzer means, each of said operator means being set to values whereby cross-effect from said first plane is compensated by said operator means.

2. A balancing machine adapted to be connected to a first transducer mounted for response to vibration of a rotor in a first plane and to a second transducer mounted for response to vibration of said rotor in a second plane, to deliver an output to an analyzer means capable of providing an amplitude and phase indication of the vibration actuating the transducers; comprising a first operator means capable of varying the phase and amplitude of an alternating current signal, a second operator means capable of varying the phase and amplitude of an alternating current signal, and switch means for sequentially connecting; one transducer to said analyzer means at a time; said first transducer to said analyzer means and said second transducer to said first operator means and said first operator means to said analyzer means; said second transducer to said analyzer means and through said first and second operator means connected in cascade to said analyzer means whereby the cross effect of a known unbalance from said first plane is compensated by said operator means.

3. A balancing machine adapted to be connected to a first transducer mounted for response to vibration of a rotor in a first plane and to a second transducer mounted for response to vibration of said rotor in a second plane, to deliver an output to an analyzer means capable of providing an amplitude and phase indication of the vibration actuating the transducers; comprising a first operator means capable of varying the phase and amplitude of an alternating current signal, a second operator means capable of varying the phase and amplitude of an alternating current signal, isolating means, and means for connecting said second transducer to said analyzer means and to the input of said first and second operator means connected in cascade, the output of said cascaded operator means being connected to said analyzer means, each of said operator means being set to values whereby the cross effect of a known unbalance from said first plane is compensated by said operator means, said isolating means being connected between the input and output of said cascaded operator means to prevent the output of the output operator means of said cascaded operator means from substantially affecting the input to said input operator means.

4. A balancing machine adapted to be connected to a first transducer mounted for response to vibration of a rotor in a first plane and to a second transducer mounted for response to vibration of said rotor in a second plane, to deliver an output to an analyzer means capable of providing an amplitude and phase indication of the vibration actuating the transducers; comprising a first operator means capable of varying the phase and amplitude of an alternating current signal, a second operator means capable of varying the phase and amplitude of an alternating current signal, an isolating means, and switch means for connecting said second transducer to said analyzer means through said isolating means and to said first and second operator means connected in cascade, the output of said cascaded operator means being connected to said analyzer means, said isolating means preventing the output of the output operator means from substantially affecting the input to the input operator means, said switch means including means for subsequently disconnecting said first and second operator means and connecting the input of said second operator means to said first transducer.

5. A balancing machine adapted to be connected to a first transducer mounted for response to vibration of a rotor in a first plane and to a second transducer mounted for response to vibration of said rotor in a second plane, to deliver an output to an analyzer means capable of providing an amplitude and phase indication of the vibration actuating the transducers; comprising a first operator means capable of varying the phase and amplitude of an alternating current signal, a second operator means capable of varying the phase and amplitude of an alternating current signal, a first isolating means, a second isolating means, and switch means for; connecting said second transducer to said analyzer means through said second isolating means and to said first and second operator means connected in cascade, the output of said cascaded operator means being connected to said analyzer means, said second isolating means preventing the output of the output operator means from substantially affecting the input to the input operator means, and for connecting said first transducer to said analyzer means and to said operator means connected in cascade, the output of said cascaded operator means being connected to said analyzer means, said first isolating means preventing the output of the output operator means from substantially affecting the input to the input operator means.

6. In a balancing machine associated with an unbalanced rotor having a known unbalance weight attached thereto in a first plane and including a first transducer mounted for response to vibration of said rotor in said first plane, a second transducer mounted for response to vibration of said rotor in a second plane, and an analyzing means actuatable by said transducers to provide an amplitude and phase indication of the vibration actuating the transducers, the improvement comprising, a first operator means capable of varying the phase and amplitude of an alternating current signal, and a second operator means capable of varying the phase and amplitude of an alternating current signal, said first operator means receiving an input from said second transducer and being so adjusted as to produce an output signal equal to the output signal which would be produced by said first transducer by said known weight, said second operator means receiving said output of said first operator means and being so adjusted as to produce an output signal equal and opposite to the cross effect signal which would be produced by said second transducer by said known weight.

7. In a balancing machine associated with an unbalanced rotor having a known unbalance weight attached thereto in a first plane and including a first transducer mounted for response to vibration of said rotor in said first plane, a second transducer mounted for response to vibration of said rotor in a second plane, and an analyzing means actuatable by said transducers to provide an amplitude and phase indication of the vibration actuating the transducers, the improvement comprising, a first operator means capable of varying the phase and amplitude of an alternating current signal, and a second operator means capable of varying the phase and amplitude of an alternating current signal, said first operator means receiving an input from said second transducer and being so adjusted as to produce an output signal equal to the output signal which would be produced by said first transducer by said known weight, said second operator means receiving said output of said first operator means and being so adjusted as to produce an output signal equal and opposite to the cross effect signal which would be produced by said second transducer by said known weight, said output of said second operator means being connected to the output of said second transducer and said summed outputs being connected to said analyzer means.

8. In a balancing machine associated with an unbalanced rotor having a known unbalance weight attached thereto in a first plane and including a first transducer mounted for response to vibration of said rotor in said first plane, a second transducer mounted for response to vibration of said rotor in a second plane, and an analyzing means actuatable by said transducers to provide an amplitude and phase indication of the vibration actuating the transducers, the improvement comprising, a first operator means capable of varying the phase and amplitude of an alterntaing current signal, and a second operator means capable of varying the phase and amplitude of an alternating current signal, said first operator means receiving an input from said second transducer and being so adjusted as to produce an output signal equal to the output signal which would be produced by said first transducer by said known weight, said second operator means receiving said output of said first operator means and being so adjusted as to produce an output signal equal and opposite to the cross effect signal which would be produced by said second transducer by said known weight, said output of said second operator means being connected to the output of said second transducer and said summed outputs being connected to said analyzer means, said output of said second operator means being connected to the output of said second transducer through means preventing said output of said second operator means from substantially affecting the output of said first operator means.

9. In a balancing machine including a first transducer mounted for response to vibration of a rotor in a first plane, a second transducer mounted for response to vibration of said rotor in a second plane, a first operator means capable of varying the phase and amplitude of an alternating current signal, a second operator means capable of varying the phase and amplitude of an alternating current signal, and an analyzer means actuatable by said transducers to provide an amplitude and phase indication of the vibration actuating the transducers, the improvement comprising switch means for sequentially connecting; one transducer to said analyzer means at a time; said first transducer to said analyzer means and said second transducer to said first operator means and said first operator means to said analyzer means; said second transducer to said anlyzer means and to said first and second operator means connected in cascade and to said analyzer means whereby the cross effect from said first plane is compensated by said operator means, said switch means including means for subsequently disconnecting said first and second operator means and connecting the input of said second operator means to said first transducer.

10. In a balancing machine including a first transducer mounted for response to vibration of a rotor in a first plane, a second transducer mounted for response to vibration of said rotor in a second plane, a first operator means capable of varying the phase and amplitude of an alternating current signal, a second operator means capable of varying the phase and amplitude of an alternating current signal, and an analyzer means actuatable by said transducers to provide an amplitude and phase indication of the vibration actuating the transducers, the improvement comprising isolating means, and switch means for connecting said second transducer to said analyzer means and to the input of said first and second operator means connected in cascade and the output of said cascaded operator means to said analyzer means, each of said operator means being set to values whereby the cross effect from said first plane is compensated by said operator means, said isolating means being connected between the input of said first operator means and the output of said second operator means to prevent the output of said second operator means from substantially affecting the input to said first operator means, said switch means including means for subsequently disconnecting said first and second operator means and connecting the input of said second operator means to said first transducer.

11. In a balancing machine including a first transducer mounted for response to vibration of a rotor in a first plane, a second transducer mounted for response to vibration of said rotor in a second plane, a first operator means capable of varying the phase and amplitude of an alternating current signal, a second operator means capable of varying the phase and amplitude of an alternating current signal, and an analyzer means actuatable by said transducers to provide an amplitude and phase indication of the vibration actuating the transducers, the improvement comprising an isolating means, and switch means for connecting said second transducer to said analyzer means through said isolating means and to said operator means connected in cascade and to said analyzer means, said isolating means preventing the output of the output operator means from substantially affecting the input to the input operator means, said switch means including means for subsequently disconnecting said first and second operator means and connecting the input of said second operator means to said first transducer.

12. In a balancing machine including a first transducer mounted for response to vibration of a rotor in a first plane, a second transducer mounted for response to vibration of said rotor in a second plane, a first operator means capable of varying the phase and amplitude of an alternating current signal, a second operator means capable of varying the phase and amplitude of an alternating current signal, and an analyzer means actuatable by said transducers to provide an amplitude and phase indication of the vibration actuating the transducers, the improvement comprising a first isolating means, a second isolating means, and switch means for connecting said second transducer to said analyzer means through said second isolating means and to said operator means connected in cascade and to said analyzer means, said second isolating means preventing the output of the output operator means from substantially affecting the input to the input operator means, and for connecting said first transducer to said analyzer means and to said operator means connected in cascade and to said analyzer means, said first isolating means preventing the output of the output operator means from substantially affecting the input to the input operator means.

13. A method of balancing a rotor in at least one plane comprising the steps of rotating said rotor and deriving therefrom at first and second spaced planes electrical signals $R_1$ and $R_2$ which are functions of the vibrations of the rotor in said planes, adding a known weight to said rotor at a known position proximate said first plane, rotating said rotor whereby an additional signal component $W_1$ is produced in said first plane and an additional cross-effect component C is produced in said second plane so that the signals derived from both planes are affected by said weight to become $R'_1$ and $R'_2$, deriving from $R'_2$ a signal equal to $+W_1$, feeding the signal $+W_1$ to an operating means to produce a signal $-C$, stopping said rotor, removing said weight, rotating said rotor to again produce said signals from said first and second planes, feeding the signal from said first plane to said operating means, and adding the output thereof to the signal from said second plane to secure a resultant signal which is indicative of the mass and position of unbalance in said second plane.

14. A method of balancing a rotor in at least one plane comprising the steps of rotating said rotor and deriving therefrom at first and second spaced planes electrical signals which are functions of the vibrations of the rotor in said planes, adding a known weight to said rotor at a known position proximate said first plane, rotating said rotor whereby an additional signal component is produced in both said planes as a result of said weight to cause the resultant signals to be modified, deriving from the modified signal from said second plane a signal equal to the additional signal component from said first plane, feeding the signal derived from said modified signal to an operating means to produce still a further signal equal and opposite to the additional signal componet from said second plane, stopping said rotor, removing said weight, rotating said rotor to again produce said signals from said first and second planes, feeding the signal from said first plane to said operating means, and adding the output of said operating means to the signal from said second plane to secure a resultant signal which is indicative of the mass and position of unbalance in said second plane.

15. A method of balancing a rotor in at least one plane through the use of a pair of transducers, a pair of operating means capable of modifying the amplitude and phase of an electric signal, and a balance analyzer means for indicating the amplitude and phase of a vibration actuating a transducer connected to said analyzer, comprising the steps of arranging said transducers to detect vibrations of said rotor in first and second planes, rotating said rotor and connecting said transducers to said analyzer means to determine the phase and amplitude of vibration in each of said two spaced planes, stopping said rotor, adding a known weight to said rotor in a known position proximate the first plane, rotating said rotor, connecting the transducer associated with said second plane to a first of said operating means, adding the output of said first operating means and the output of the transducer associated with the first plane and feeding the summed output to said analyzer means to obtain a phase and amplitude indication for said first plane, adjusting the controls of said first operating means to bring the phase and amplitude indication of said first plane to the value originally obtained on rotation of said rotor, disconnecting said transducer associated with said first plane, feeding the output of said first operating means to said second operating means and adding the output thereof to the output of the transducer associated with the second plane, feeding said summed signals to said analyzer means to obtain an indication of phase and amplitude for said second plane, adjusting said second operating means to secure the same phase and amplitude indication on said second plane as was originally secured on rotating said rotor, stopping said rotor, removing said weight, rotating said rotor, connecting said transducer associated with said first plane to said second operating means, adding the output of said second operating means to the output of the transducer associated with said second plane, and connecting said summed signals to said analyzing means to indicate the true phase and amplitude of unbalance in said second plane.

16. A method of eliminating the indicated effect in one plane of unbalance in another plane through the use of a pair of transducers, a pair of operating means capable of modifying the amplitude and phase of an electric signal, and a balance analyzer means for indicating the amplitude and phase of a vibration actuating a transducer connected to said analyzer, comprising the steps of arranging said transducers to detect vibrations of said rotor in first and second planes, rotating said rotor and connecting said transducers to said analyzer means to determine the phase and amplitude of vibration in each of said two spaced planes, stopping said rotor, adding a known weight to said rotor in a known position proximate the first plane, rotating said rotor, connecting the transducer associated with said second plane to a first of said operating means, adding the output of said first operating means and the output of the transducer associated with the first plane and feeding the summed output to said analyzer means to obtain a phase and amplitude indication for said first plane, adjusting the controls of said first operating means to bring the phase and amplitude indication of said first plane to the value originally obtained on rotation of said rotor, disconnecting said transducer associated with said first plane, feeding the output of said first operating means to said second operating means and adding the output thereof to the output of the transducer associated with the second plane, feeding said summed signals to said analyzer means to obtain an indication of phase and amplitude for said second plane, and adjusting said second operating means to secure the same phase and amplitude indication on said second plane as was originally secured on rotating said rotor.

17. A method of plane separation through the use of a pair of transducers and a pair of operating means capable of modifying the phase and amplitude of an alternating current signal comprising, adjusting one operating means so that when it is energized by one transducer it produces a signal equal to that which would be produced by the other transducer for a known weight, feeding the signal produced by said one operating means to the other operating means, adjusting the second operating means to nullify any cross-effect from said known weight, and connecting said adjusted second operating means to said other transducer and its output to the output of the one transducer whereby the summed output is free of cross-effect originating in said other transducer.

18. A method of balancing a rotor in at least one plane comprising the steps of rotating said rotor and deriving therefrom at first and second spaced planes electrical signals $R_1$ and $R_2$ which are functions of the vibrations of the rotor in said planes, adding a known weight to said rotor at a known position proximate said first plane, rotating said rotor whereby an additional signal component $W_1$ is produced in said first plane and an additional cross effect component C is produced in said second plane so that the signals derived from both planes are affected by said weights to become $R'_1$ and $R'_2$, deriving from $R'_2$ a signal equal to $+W_1$, deriving a calibration both as to amplitude and phase angle from the known weight and position of said weight and the observed amplitude and phase of $+W_1$, feeding the signal $+W_1$ to an operating means to produce a signal $-C$, stopping said rotor, removng said weight, rotating said rotor to again produce said signals from said first and second planes, feeding the signal from said first plane to said operating means, and adding the output thereof to the signal from said second plane to secure a calibrated resultant signal which is indicative of the mass and position of unbalance in said second plane.

References Cited in the file of this patent

UNITED STATES PATENTS

| | | |
|---|---|---|
| 2,165,024 | Baker | July 4, 1939 |
| 2,243,379 | Johnson | May 27, 1941 |
| 2,315,578 | Baker | Apr. 6, 1943 |
| 2,331,733 | Senger | Oct. 12, 1943 |
| 2,405,430 | Kent | Aug. 6, 1946 |
| 2,461,645 | Kallmann | Feb. 15, 1949 |
| 2,805,576 | Rambo | Sept. 10, 1957 |
| 2,851,885 | Federn et al. | Sept. 16, 1958 |
| 2,966,801 | Nemec et al. | Jan. 3, 1961 |

FOREIGN PATENTS

| | | |
|---|---|---|
| 1,219,774 | France | Dec. 28, 1959 |

UNITED STATES PATENT OFFICE
CERTIFICATE OF CORRECTION

Patent No. 3,143,888                      August 11, 1964

Glen H. Thomas et al.

It is hereby certified that error appears in the above numbered patent requiring correction and that the said Letters Patent should read as corrected below.

Column 1, line 41, for "carriages" read -- carriage --; column 4, line 9, for "thet" read -- the --; column 5, line 43, for "leg" read -- lag --; column 7, line 61, for "channed" read -- channel --; column 9, line 8, for "networks" read -- network --; line 20, strike out "to", first occurrence; column 12, line 61, for "weight)" read -- (weight) --.

Signed and sealed this 27th day of April 1965.

(SEAL)
Attest:

ERNEST W. SWIDER
Attesting Officer

EDWARD J. BRENNER
Commissioner of Patents